Feb. 8, 1949.　　　C. A. NEUMANN ET AL　　　2,461,435
FLUID PROPELLED AND CONTROLLED AIRCRAFT
Filed April 19, 1945　　　　　　　　　　　　5 Sheets-Sheet 2
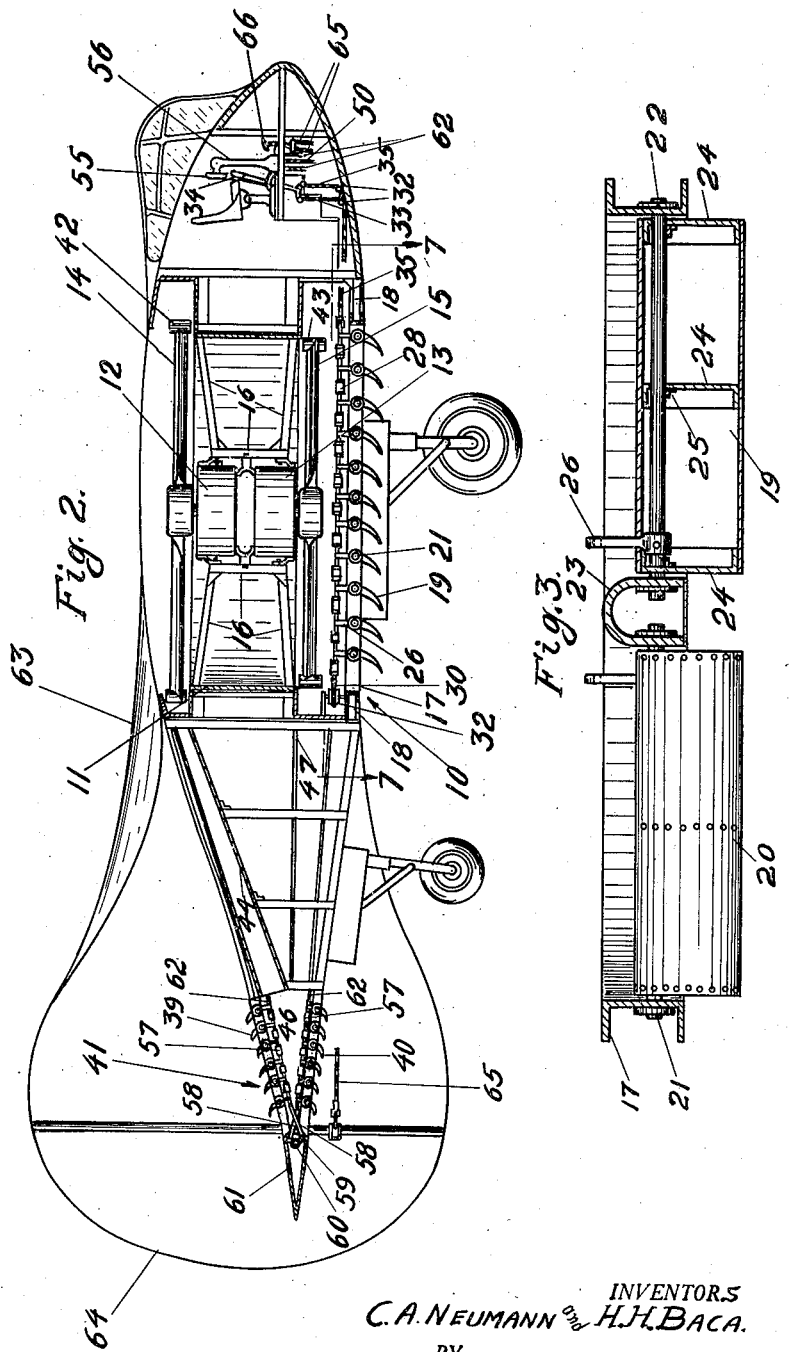
INVENTORS
C. A. NEUMANN and H. H. BACA.
BY
A. D. Adams
ATTORNEY

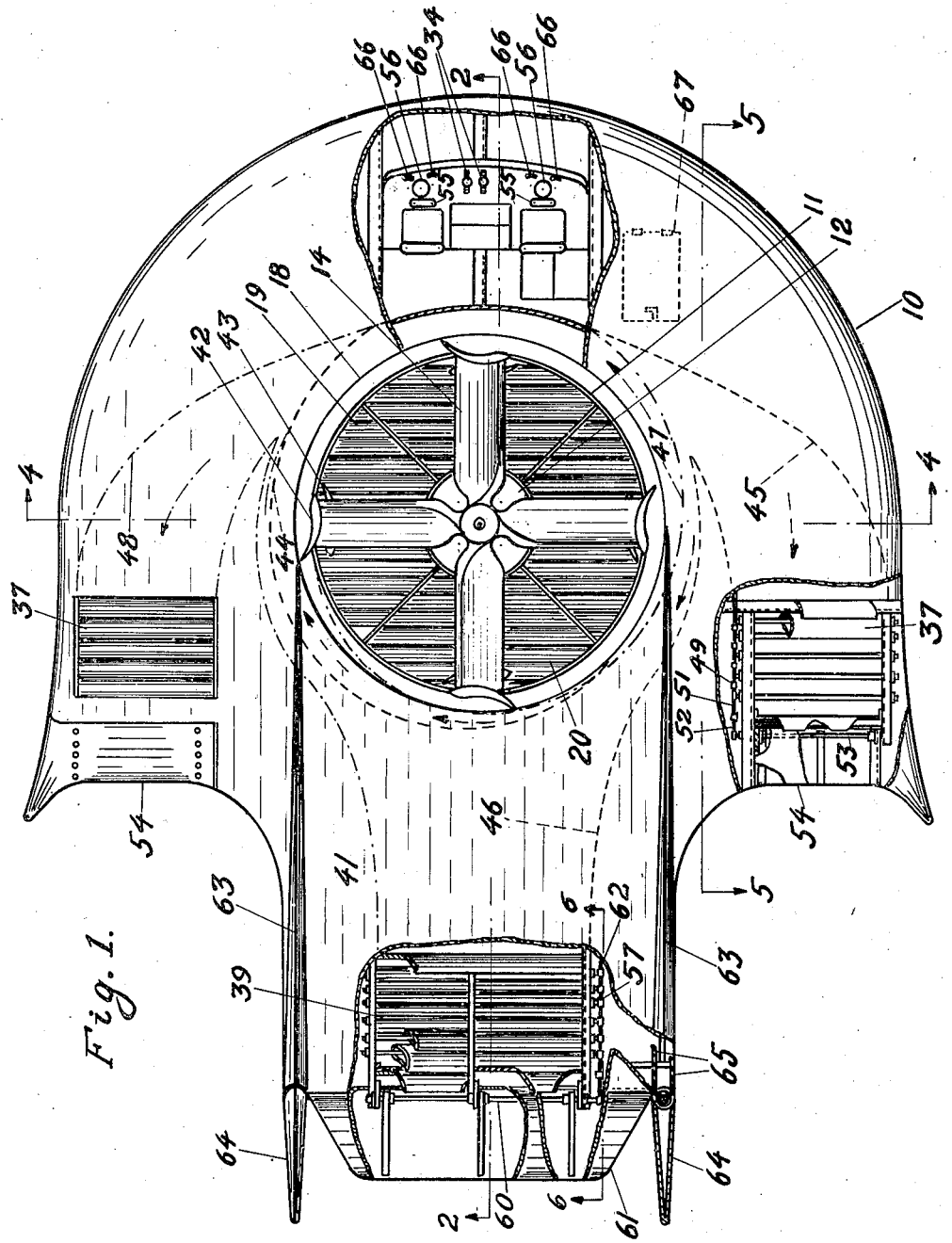

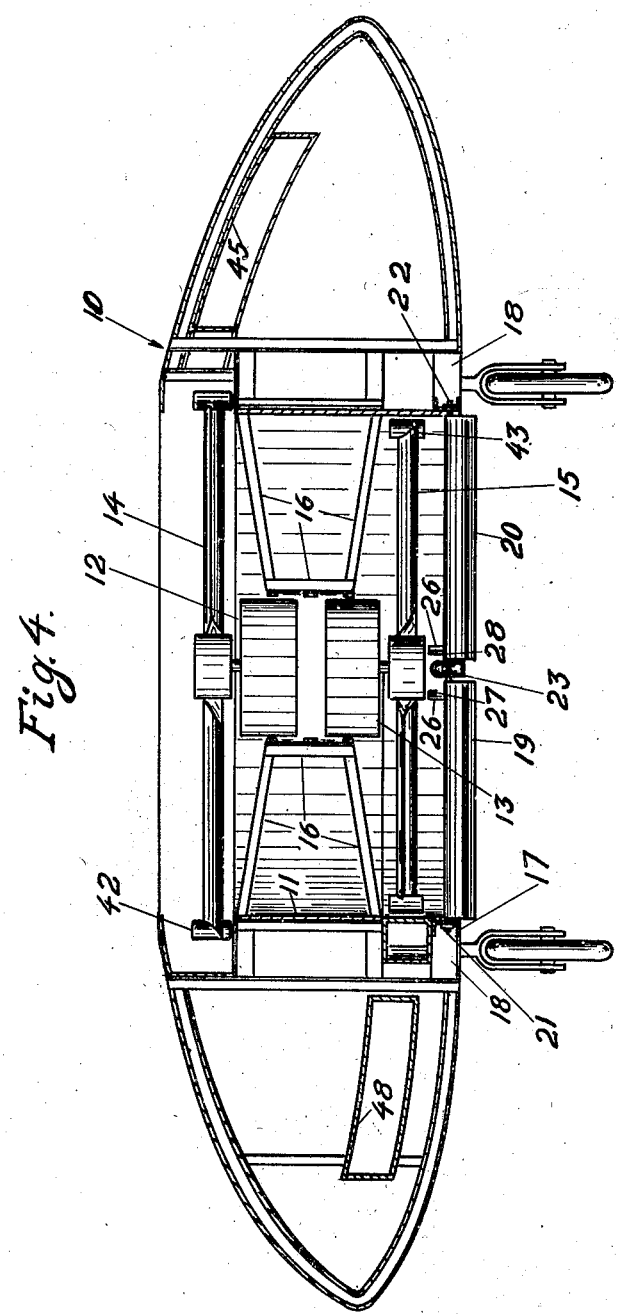

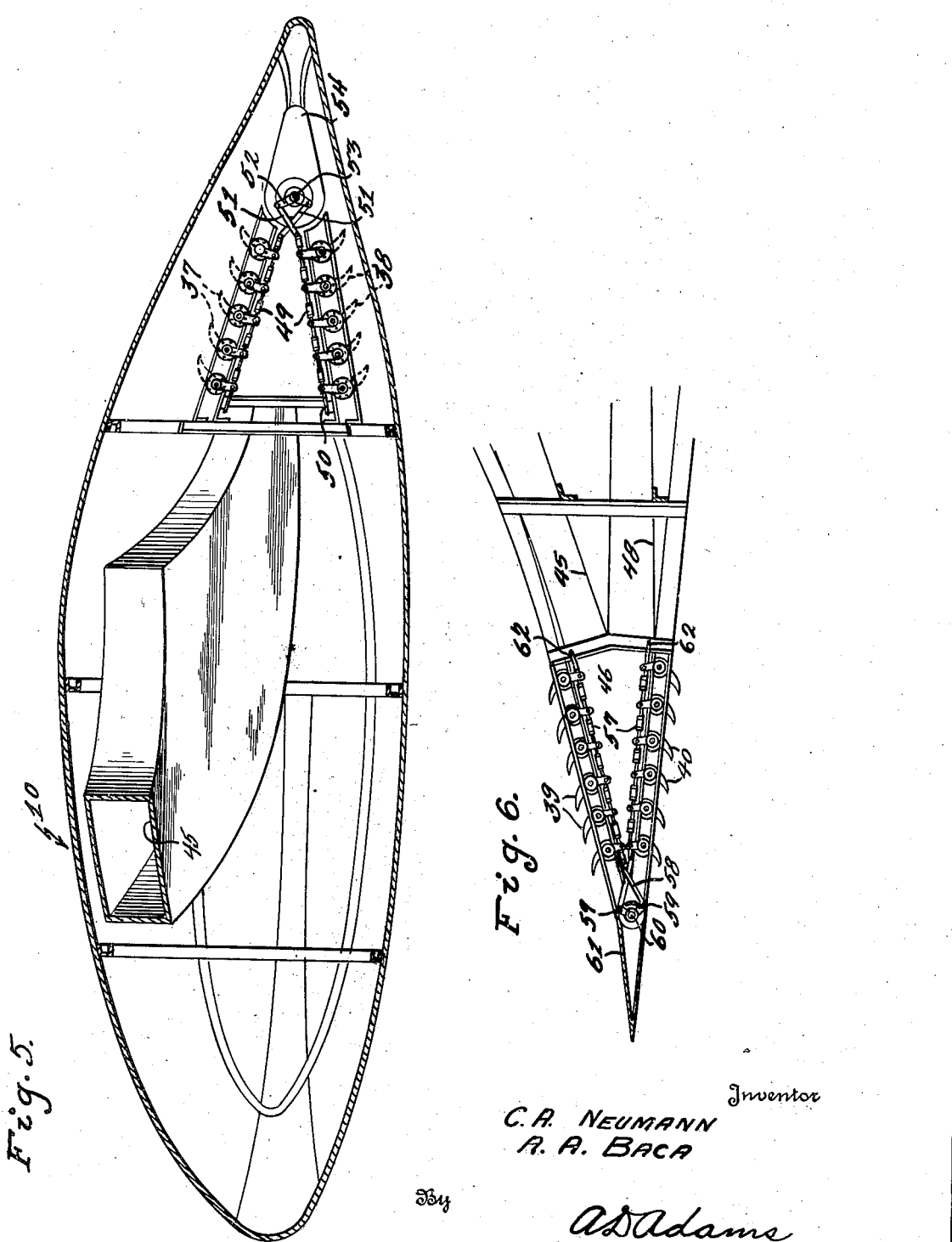

Feb. 8, 1949. C. A. NEUMANN ET AL 2,461,435
FLUID PROPELLED AND CONTROLLED AIRCRAFT
Filed April 19, 1945 5 Sheets-Sheet 5

INVENTORS
C.A. NEUMANN and H.H. BACA.
BY
A.D. Adams
ATTORNEY.

Patented Feb. 8, 1949

2,461,435

UNITED STATES PATENT OFFICE 2,461,435

FLUID PROPELLED AND CONTROLLED AIRCRAFT

Charles A. Neumann and Hugo H. Baca, Corpus Christi, Tex.

Application April 19, 1945, Serial No. 589,184

7 Claims. (Cl. 244—12)

This invention relates to a novel type of aircraft which combines certain principles of the helicopter with those of an airplane and, among other objects, aims to provide an aircraft of this type embodying power and control means to produce both vertical lift and forward motion arranged within the confines of an enlarged airfoil or fuselage.

Another aim is to provide an aircraft which is generally shaped like a king crab, provided with air tunnels and louvers to produce forward, upward and lateral reactions, as well as to provide for lateral and longitudinal balance.

Another aim of the invention is to provide an aircraft having a forward fuselage portion, which is generally semi-circular in plan and having propellers arranged within a power well to create air streams for propelling, lifting and controlling the craft.

Still another aim of the invention is to provide an amphibious aircraft adapted to be propelled in any direction and at any speed within the limits of its power and which can even be so controlled as to fly backwardly at a slow speed.

Still another aim of the invention is to provide louver controls constructed and arranged to produce air reactions for propelling and stabilizing the craft.

Another important aim is to provide a novel amphibious aircraft which is capable of carrying heavy loads and embodies many new structural features.

Other aims and advantages of the invention will appear in the following description, in connection with the accompanying drawings, showing one illustrative embodiment of the invention, wherein:

Fig. 1 is a top plan view showing one embodiment of the invention, parts being broken away;

Fig. 2 is a sectional view on the line 2—2 of Fig. 1;

Fig. 3 is a vertical sectional view showing a pair of power louvers and their supporting structure;

Fig. 4 is a sectional view on the line 4—4 of Fig. 1;

Fig. 5 is a sectional view on the line 5—5 of Fig. 1;

Fig. 6 is a fragmentary sectional view on the line 6—6 of Fig. 1; and

Figure 7:
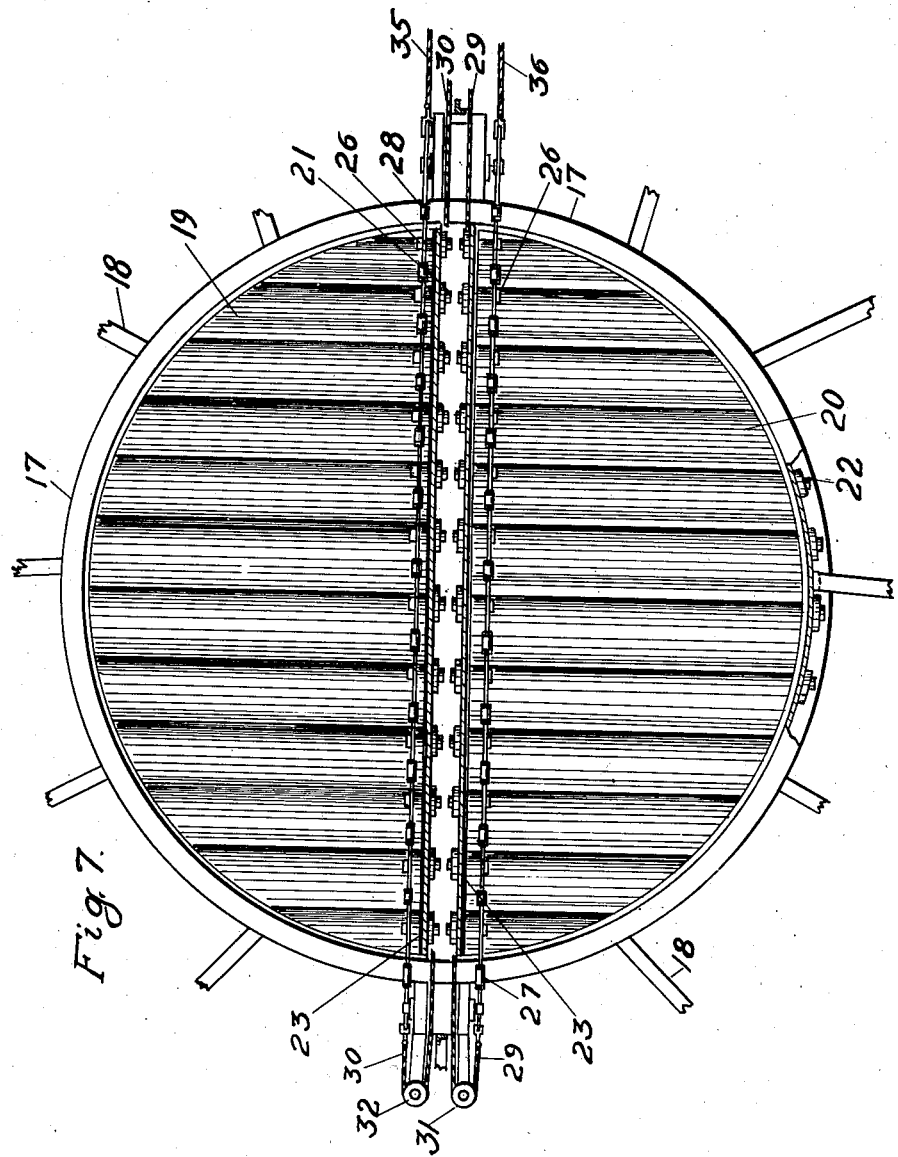
Fig. 7 is a sectional view on the line 7—7 of Fig. 2.

Referring more particularly to the drawings, the illustrated form of the invention includes a fuselage 10, which is shown as being shaped like a king crab or in the form of an airfoil, as viewed in side elevation, to increase the lift on forward propulsion and reduce the air resistance. This shape lends itself readily to alighting on water and provides a maximum space for cargo or passengers. It has the usual retractable landing gear for alighting on the ground.

In accordance with the invention, the fuselage is provided with a substantially central power well, shown as being partially defined by a wall 11, which happens to be generally cylindrical. However, it is contemplated that this power well may be Venturi-shaped or can assume any other desired shapes in order to make the application of the power more effective. Herein, a pair of motors 12 and 13 are shown as being suitably supported in the central portion of the well to drive air screws or propellers 14 and 15, respectively, in opposite directions to avoid torque. They may be controlled in any conventional manner (not shown). Of course, the motors can be located at any other convenient place within the confines of the fuselage. The propellers are preferably arranged near the upper and lower ends of the well and the entire power unit is shown as being carried by supporting frame members 16.

The well is shown as being open at its upper end and it is substantially concentric with the semi-circular portion of the fuselage and includes the center of gravity of the craft. Within the lower end of the well there is mounted a substantially cylindrical frame 17 supported by generally radial beams 18 and carrying two groups of power louvers 19 and 20 so constructed and arranged as to divert the air stream passing through the well and create the desired reaction forces for forward propulsion and for elevating the craft. These louvers are shown as being shaped like airfoils and are pivotally mounted within the frame 17 by means of shafts 21 and 22, respectively, and the frame has a central or diametrically disposed, inverted U-shaped beam 23 for the inner ends of the shafts, as clearly shown in Fig. 3. The shafts may be keyed or otherwise rigidly connected to the louvers, as shown. In this instance, the louvers are hollow, having end plates and central reinforcing webs 24 to which the shafts are rigidly connected by means of flanged collars 25. Each louver is shown as having a crank arm 26 projecting through its upper edge adjacent to the central beam member 23 and the two sets of crank arms are arranged in longitudinal rows. They are shown as being pivotally connected to articulated members 27 and 28 so that they can be moved to adjust the louvers to any desired angular position. It is to be understood, however, that suitable gearing or hydraulic operating means can be employed for this purpose. The two groups of louvers are shown as being adapted to be operated independently of each other, both groups of power louvers are adapted to be swung forwardly beyond their vertical positions to direct the air stream forwardly and propel the craft rearwardly.

The rear ends of the link members 27 and 28 are shown, in Fig. 7, as being connected to cables 29 and 30, respectively, trained around pulleys 31 and 32 and extending forwardly to bell crank arms 33 on separate control levers 34 in the pilot's cabin, accessible to both the pilot and co-pilot; although suitable dual controls may be employed. The forward ends of the link members are also shown as having cables 35 and 36 connected to the crank arms of said levers. The arrangement is such that the levers positively operate the louvers in both directions. Of course, suitable power operating means can be employed for this purpose and it is within the concept of this invention to employ a single power control for both groups of louvers. The louvers are shown as being adjusted to direct the air stream downwardly and rearwardly from the well to create both forward and lifting reactions.

In accordance with the invention, the two propellers are also designed to create auxiliary air streams for controlling the craft and for creating additional propulsion reactions by directing air streams through upper and lower sets of aileron louvers 37 and 38 on opposite sides of the fuselage, as well as similar sets of louvers 39 and 40 arranged in the tail structure 41 of the craft. For this purpose, the respective propeller blades of each set are provided with peripheral blade tips 42 and 43, respectively, for directing a portion of the air radially therefrom. The upper set of blades is designed to rotate clockwise, as viewed in Fig. 1, and the tips are confined within a generally spiral channel 44 discharging into a lateral tunnel 45 and through the right hand set of aileron louvers 37 and 38. Also, these blade tips are designed to discharge a portion of the radial air stream rearwardly through a tail tunnel 46 leading to the stabilizer or tail louvers 39 and 40. The tips 43 on the blades of the lower propeller 15 are arranged within a channel 47, similar to the upper channel 44, to discharge through a lateral tunnel 48 and the left hand set of aileron louvers 37 and 38. It also discharges a portion of the radial air stream rearwardly into the tail tunnel 46.

The aileron louvers 37 and 38 on each side may be controlled by any suitable control means. The construction and arrangement is such that the upper and lower louvers are operated simultaneously, but in opposite directions; that is to say, the upper ones open while the lower ones close. In this instance, the louvers are shown as being adjusted by articulated links 49 and cables 50, similar to the links and cables for adjusting the power louvers. The rear ends of the articulated links are connected by pivoted crossed links 51 to bell crank arms 52 on shafts 53 of aileron flaps 54, the arrangement being such that the flaps are adjusted simultaneously with and in the same direction as the adjusting movements of the louvers, so that, when one set of louvers is closed the other set is open and directs air streams against the aileron flaps to provide for lateral control under all flight conditions, especially when the craft is hovering or ascending and descending. The operating cables 50 are shown as being connected to be operated by the control wheels 55 on the joy sticks 56 in the pilot's cabin, in the same manner as ordinary ailerons are operated, the runs of the cables on the opposite sides being so connected as to operate the corresponding louvers and the ailerons on the opposite sides in opposite directions. Of course, any other well known operating means can be employed for this purpose.

The tail louvers 39 and 40 are also shown as being connected to be adjusted by articulated links 57, which are connected by pivoted crossed links 58 to bell cranks 59 on the shaft 60 of a longitudinal stabilizer flap 61. Cables 62 are shown as being connected to the forward ends of the articulated links and to the lower ends of the joy sticks 56 to be manipulated by the fore and aft movements thereof in the same manner as an ordinary stabilizer is operated. The arrangement is such that the louvers are swung in the same direction as the stabilizer and, when one set of louvers is closed the other set is opened to direct streams of air against the stabilizer, to provide the necessary longitudinal stabilizing control under all flight conditions, because they are adapted to swing into the air streams issuing through the stabilizer louvers to increase their control effect during flight and to steer the craft when it is hovering.

In this example, the craft is shown as having two longitudinal fins 63 beginning as ribs on opposite sides of the power well, as shown in Figs. 1 and 2, and having very large rudders 64 connected thereto and operated by cables 65 secured to pairs of rudder pedals 66 in the pilot's cabin. The large rudders provide for quick correction of side-slip under all flight conditions.

The pilot's cabin is shown as having a bottom entrance hatchway and door 67 adapted to be swung downwardly to provide a loading entrance. Of course, any required number of loading hatches or entrances may be provided in other parts of the craft. Furthermore, abundant storage and fuel compartments (not shown) may be provided in the fuselage around the power well to produce the best distribution of the load and maintain the center of gravity of the craft near the axis of the power well.

From the foregoing description, it will be seen that the invention provides a new type of aircraft which is capable of all kinds of control. If desired, two or more laterally spaced power wells can be employed in large crafts and the lateral control can be accomplished by adjusting the power louvers without using aileron louvers. It will be observed that the controlling effects made possible by employing two groups of independently adjustable power louvers in one power well are substantially the same as if the louvers were arranged in separate, laterally spaced power wells. The design affords abundant passenger and/or cargo space, as well as the possibility of excellent visibility for passengers.

It is contemplated that the craft may be provided with wings of any well known type to supply the necessary aspect ratio for gliding or landing without power. Moreover, other obvious or required safety features may be added in order to comply with regulations.

Obviously, the present invention is not restricted to the particular embodiment herein shown and described. Moreover, it is not indispensable that all the features of the invention be used conjointly, since they may be employed advantageously in various combinations and subcombinations.

What is claimed is:

1. An aircraft of the character described having a substantially vertical power well; a pair of propellers mounted in the upper and lower portions of the well and rotatable in opposite directions to create the air stream for propelling the craft; directional control means for the air stream in the bottom portion of the well; means connected and arranged to divert portions of the air stream laterally and to discharge them rearwardly on opposite sides of the craft; and adjustable control means connected to direct the discharge of the diverted streams in such manner as to control the lateral stability of the craft.

2. An aircraft of the character described having a substantially vertical power well; a pair of propellers mounted in the upper and lower portions of the well and rotatable in opposite directions to create the air stream for propelling the craft; directional control means for the air stream in the bottom portion of the well; means connected and arranged to divert a portion of the air stream rearwardly and to discharge it through the tail portion of the craft, and adjustable control means to direct the diverted stream in such manner as to control the longitudinal stability of the craft.

3. An aircraft, as set forth in claim 1, wherein the adjustable control means for the diverted air streams comprise upper and lower sets of pivoted louvers on each side.

4. An aircraft, as set forth in claim 1, wherein the adjustable control means comprise upper and lower sets of partially opened, pivoted louvers for the diverted air streams; ailerons arranged behind said louvers; and operating means connected to adjust the louvers and ailerons simultaneously, the operating connections being such as to open one set of louvers of each side and close the other set and, at the same time, to swing respective ailerons into the air streams issuing through the opened louvers.

5. An aircraft, as set forth in claim 2, wherein the adjustable control means for the diverted air stream comprises upper and lower sets of partially opened, transverse louvers; a longitudinal stabilizer behind said louvers; and operating means connected to adjust the louvers and the stabilizer simultaneously, the operating connections being such as to open one set and close the other set and, at the same time, to swing the stabilizer into the air stream issuing from the opened louvers.

6. An aircraft, as set forth in claim 2, wherein the adjustable control means for the diverted air stream comprises upper and lower sets of partially opened, transverse louvers; a longitudinal stabilizer behind said louvers; operating means connected to adjust the louvers and the stabilizer simultaneously; a pair of large spaced rudders arranged behind and on opposite sides of the louver assemblies so that one or the other can swing into the air stream issuing through the louvers; and control means connected to operate two rudders simultaneously.

7. An aircraft, as set forth in claim 1, wherein the propellers have outwardly curved blade tips shaped to create the diverted air streams.

CHARLES A. NEUMANN.
HUGO H. BACA.

REFERENCES CITED

The following references are of record in the file of this patent:

UNITED STATES PATENTS

| Number | Name | Date |
|---|---|---|
| 1,233,820 | Stage | July 17, 1917 |
| 1,296,631 | Davis | Mar. 11, 1919 |
| 1,822,386 | Andersen | Sept. 8, 1931 |
| 2,377,835 | Weygers | June 5, 1945 |

FOREIGN PATENTS

| Number | Country | Date |
|---|---|---|
| 11,882 | Great Britain | 1910 |
| 18,039 | Great Britain | 1912 |
| 399,886 | Great Britain | Oct. 19, 1933 |